US008700737B2

(12) United States Patent
Ponnavaikko et al.

(10) Patent No.: US 8,700,737 B2
(45) Date of Patent: Apr. 15, 2014

(54) AUTOMATED METHOD FOR GENERATING A WEB SERVICE COMPOSITION

(75) Inventors: Kovendhan Ponnavaikko, Tamil Nadu (IN); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 5 days.

(21) Appl. No.: 13/484,409

(22) Filed: May 31, 2012

(65) Prior Publication Data
US 2013/0326021 A1 Dec. 5, 2013

(51) Int. Cl.
*G06F 15/16* (2006.01)

(52) U.S. Cl.
USPC ......................................................... 709/218

(58) Field of Classification Search
USPC .......................................................... 709/218
See application file for complete search history.

(56) References Cited

U.S. PATENT DOCUMENTS

| | | | |
|---|---|---|---|
| 7,191,448 B2 * | 3/2007 | Simpson et al. | 719/311 |
| 7,584,454 B1 * | 9/2009 | Massoudi | 717/121 |
| 8,019,652 B1 * | 9/2011 | Frederick et al. | 705/26.1 |
| 2003/0097464 A1 * | 5/2003 | Martinez et al. | 709/238 |
| 2005/0132381 A1 * | 6/2005 | Fiammante et al. | 719/310 |
| 2006/0095544 A1 * | 5/2006 | Geppert et al. | 709/218 |
| 2009/0183171 A1 * | 7/2009 | Isaacs et al. | 719/311 |
| 2009/0271707 A1 * | 10/2009 | Lin et al. | 715/738 |
| 2010/0114720 A1 * | 5/2010 | Jones et al. | 705/14.73 |
| 2011/0173071 A1 * | 7/2011 | Meyer et al. | 705/14.54 |
| 2012/0029978 A1 * | 2/2012 | Olding et al. | 705/7.42 |

FOREIGN PATENT DOCUMENTS

| | | | |
|---|---|---|---|
| EP | 1811373 A1 * | 7/2007 | |
| JP | 2008003709 A * | 1/2008 | |

* cited by examiner

*Primary Examiner* — Kostas Katsikis

(57) ABSTRACT

The disclosed embodiments relate to creating a web service composition from a plurality of web services. For creating the web service composition, an augmented definition of the plurality of web services is created. Based on the augmented definition and a user request, a task listing the required inputs for the plurality of web services, the required outputs of the plurality of the web services, the mapping between the output of one service to the input of the second service is computed. The task of identifying the required inputs for the plurality of web services, the required outputs of the plurality of the web services, and the mapping between the output of one service to the input of the second service is crowd sourced to crowd workers who submit their responses to an online crowd sourcing platform. The collected responses are used to generate the desired web service composition.

11 Claims, 7 Drawing Sheets

AUTOMATED METHOD FOR GENERATING A WEB SERVICE COMPOSITION

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are directed to software-based method for crowdsourcing of various tasks for creating a web service composition from multiple web services.

BACKGROUND

With the advancement in web technology and the never-ending need of users for more and more information, web service compositions, also referred to as Mash-ups, have become very popular. Web service compositions essentially gather data from more than one source and use it to provide a combined output to the user. The task, however, is difficult for someone with less software programming experience.

Further, if the task has to be outsourced, it also takes up a lot of monetary resources. This happens because of the lack of one individual who has the expertise of performing all the steps required to create a web service composition. A way to remedy this is to distribute the task between multiple workers. This in effect would bring-down the cost required for creating a web service composition.

The concept referred to above is commonly known as crowdsourcing. Crowdsourcing is a technique wherein a task is executed by multiple people. The tasks are typically simple and repetitive, however, require manual intervention. The tasks can be published by a user on an online crowd sourcing platform, where various crowd workers are registered and they can opt to undertake various tasks in return for some compensation. Currently, there are many online platforms which facilitate users to publish tasks which can then be completed by crowd workers. Given the nature of the tasks which are crowdsourced and the remuneration involved, a crowd worker generally tries to complete the work in a very short span of time and also does not comprehensively pay heed to the instructions provided by the user. One of the biggest problems with crowdsourcing is the amount of manual effort required to remove the incorrect responses received from crowd workers and short-list only the correct responses. In various experiments that have been performed, it has been criticized that the quality of output received from the crowd workers is very poor. Possible reasons for the occurrence of these errors have been listed above.

The disclosed embodiments seek to provide an easy to use method and computer program code which can be used by any user to create a web service composition. In the process, the embodiments also seek to alleviate the various problems associated with crowdsourcing of tasks.

SUMMARY

In an embodiment, a computer implemented method is provided to crowd source the task of creating a web service composition. The method comprises a first step of creating an augmented definition of a plurality of web services. A request for creating a web service composition is received from a user. Subsequently, the user request and the augmented definition of the plurality of web services are used to automatically create tasks which can be easily and comprehensively understood by remote crowd workers. The responses of the crowd workers are collected and used to create the web service composition in an automated manner.

In an embodiment, there is provided a computer implemented method for creating a web service composition from a plurality of web services. The method comprises the steps of creating an augmented definition of the plurality of web services. A natural language request for a web service composition is received and on the basis of the natural language request and the augmented definition, an input required for the plurality of web services, an output expected from the plurality of web services, and an instruction for mapping of an output of one of the plurality of web services to an input of another one of the plurality of web services is generated. Further, the input, output, and mapping is published to a plurality of crowd workers. The input for the plurality of the web services, the output for the plurality of web services, and mapping of the output of one of the plurality of web services to the input of another one of the plurality of web services are received from the crowd workers and the same is used to construct an executable file. The executable file is finally used to generate a web service composition.

In another embodiment, there is provided a computer program product to create a web service composition from a plurality of web services. The computer program product comprises program instruction means to create augmented definitions of a plurality of web services. The computer code further comprises program instruction means to receive a natural language request from as user to create a web service composition. Subsequently, the computer code generates on the basis of the user request and the augmented definition, well-defined tasks which can be presented to a plurality of remote crowd workers. The computer code further comprises means to collect responses from the crowd workers and use the responses to generate the desired web service composition.

BRIEF DESCRIPTION OF DRAWINGS

Various embodiments will hereinafter be described in accordance with the appended drawings provided to illustrate and not to limit the scope in any manner, wherein like designations denote similar elements, and in which.

DETAILED DESCRIPTION OF DRAWINGS

Figure 1:
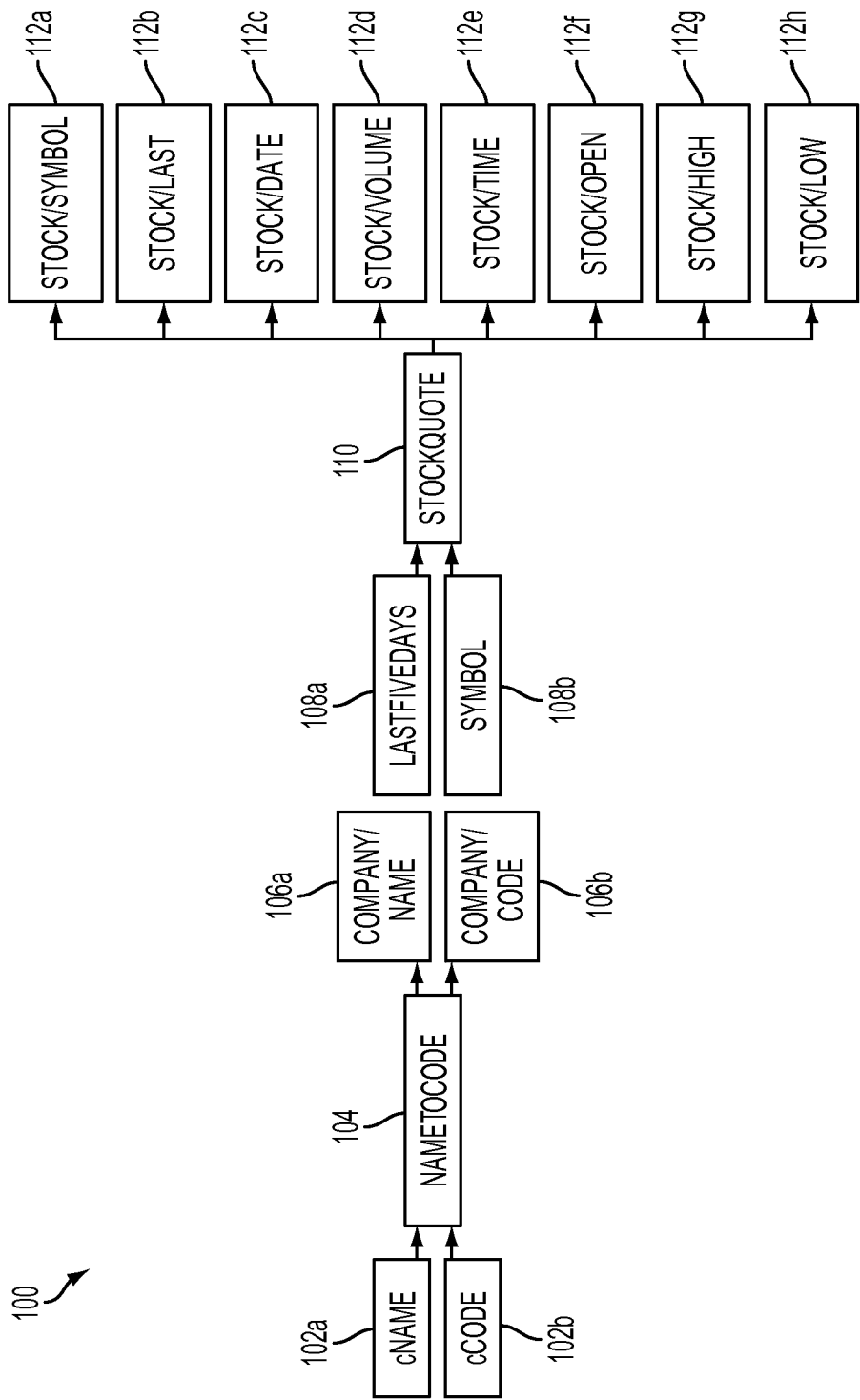
FIG. 1 is a block diagram illustrating an exemplary relationship between the input and output of a first web service and a second web service for creating a web service composition in accordance with an embodiment.

The present disclosure is best understood with reference to the detailed figures and description set forth herein. Various embodiments are discussed below with reference to the figures. However, those skilled in the art will readily appreciate that the detailed description given herein with respect to these figures is just for explanatory purposes as the method and the system extend beyond the described embodiments. For example, those skilled in the art will appreciate, in light of the teachings presented, recognizing multiple alternate and suitable approaches, depending on the needs of a particular application, to implement the functionality of any detail described herein, beyond the particular implementation choices in the following embodiments described and shown. The detailed description of the embodiments will now be presented in conjunction with the accompanying drawings.

Definition of Terms: Terms not specifically defined herein should be given the meanings that would be given to them by one of skill in the art in light of the disclosure and the context. As used in the present specification and claims, however, unless specified to the contrary, the following terms have the meaning indicated.

A "web service" refers to a publically available website available for access to users through the Internet.

"Augmented definition" refers to any modification made by a user/administrator to the script of a web service. In an embodiment, modifications are made to the script of a web service to append specialized tags identifying the inputs and outputs of the web service. In an embodiment, the identified inputs, outputs of various services, and the mapping between their respective inputs and outputs are used to create easily understandable tasks for crowd workers.

"Crowdsourcing" refers to the process of distributing a task to multiple workers located at different locations. In an embodiment, tasks can be published on any of the various crowdsourcing platforms and registers workers can view the task and choose to undertake it in return for a pre-decided remuneration.

A method and a system suitable for enabling crowdsourcing for creating a web service composition are provided. A service composition is a result of combining the services of two or more web service to generate a composite output. Most web services today are based on either Simple Object Access Protocol (SOAP) or the more recent Representational state transfer (RESTFul) web services. The SOAP-based services typically use WSDL (Web Service Description Language) for describing the locations and capabilities of network services, registry mechanisms such as UDDI (Universal Description, Discovery, and Integration) for client and servers to find each other and SOAP for exchanging Extensible Markup Language (XML) based information. Very popular web services are generally considered to be too complex and heavy-weight because of the usage of SOAP/HTTP enveloped XML messages.

RESTFul web services on the other hand are light-weight and can be easily accessed from all web browsers. In order to make the web service light-weight, RESTFul web services do away with many communication layers. However, as a result of the prevalent semantic and syntactic heterogeneity in Application Programming Interface (API), data formats and communication protocols, creating a web service composition today is complex and time consuming, and often requires technical expertise in terms of programming knowledge. This problem is especially exacerbated in RESTFul web services.

In an embodiment, there is provided a system and a computer program code to easily create a web service composition from a plurality of web services by crowdsourcing the various tasks involved in creating the web service composition. The plurality of web services are based on RESTFul services in an embodiment. For achieving the objective of creating the web service composition through crowdsourcing, it is imperative to present a simplified task to the crowd worker so that he/she can easily comprehend the response that is needed for completing the task. In order to present a simplified task to the user, a one-time activity of creating an augmented definition of the plurality of web services is required.

The creation of the augmented definition of the plurality of web services can be performed by the service provider in accordance with an embodiment. The APIs for RESTFul web services are generally unstructured and often difficult to understand. Hence, in order to simplify the crowd tasks, an augmented definition of the web services is required which can help capture the various options for the inputs and outputs of the web services required for the web service composition. For creating the augmented definition of the plurality of web services, web application description language (WADL) is used. The WADL provides a machine-readable description of web-based services and can be accessed in an Extensible Markup Language (XML) format for any web service. Modifications are made to the WADL of the plurality of web services in order to extract the various possible inputs and outputs to the web services. Specialized tags are added to the WADL files in order to make the input/outputs understandable and programmatically extractable. Once the augmented definition of the web service has been created, the process of creating the crowd task using the simplified and defined response options for the crowd worker can be directly automated and created. In another embodiment, if the service description of the web service is XML-based, then the specialized tags can directly be included in the XML definition in order to identify the various inputs and outputs of the web service. For the sake of simplicity, the augmented definition of a web service can be perceived as the identification of the various inputs and outputs of the web service and it will be appreciated by a person skilled in the art that the process detailed above for creating a web service's augmented definition is only for exemplary purposes and various other techniques can be used to create the augmented definition of the web service without departing from the scope of the disclosed embodiments. The advantages of creating the augmented definition for the plurality of web services will be made explicit in the foregoing detailed description of the various drawings.

FIG. 1 is a block diagram illustrating an exemplary relationship between the input and output of a first web service 104 and a second web service 110 for creating a web service composition in accordance with an embodiment. In this exemplary scenario, a user intends to obtain the current stock quote of a company given the company's name. For achieving this objective, a user can use any commonly available web service which provides the stock quotes of public companies. However, this requires the user to be aware of the trading symbol of the company of interest. If the user is unaware of the trading symbol, he can use another web service to extract the trading symbol for the company of interest by entering the name of the company of interest in to the web service. For obtaining the required output, the user has to understand the required input to the first web service 104, the output of the first web service 104 which can act as input to the second service 110, and the output of the second service 110 which can serve the purpose of obtaining the stock quote. The possible inputs to the first web service 104 are represented by 102*a* and 102*b*. The outputs of the first web service 104 are represented by 106*a* and 106*b*. The inputs to the second web service 110 are represented by 108*a* and 108*b*. The various possible outputs of the second web service 110 are depicted by 112*a* to 112*h*.

The aforementioned process is time consuming. Further, in order to achieve the objective in an automated fashion without user intervention, the user has to be technically aware of the concepts of computer programming to generate an executable file which can achieve the aforementioned objective. In order to cut costs and reduce the time involved, this task can be distributed to crowd workers.

As shown in FIG. 1 a first web service 104 and a second web service 110 are used to obtain the current stock quote of a company given the company's name.

For manually achieving the aforementioned objective, the user should know that out of the multiple inputs possible to the first web service he/she has to use the name of the company as the input. Further, the user should know that out of the multiple outputs received from the first web service 104, the user needs to select the company code as the required output. Then the user should be aware that this output of the first web service 104 should be entered as the input to the second web service 110. Finally, the user should be aware which output of the second web service 110 serves his objective of generating this particular web service composition. In order to save a user, not versed with computer programming, from dealing with the lengthy aforementioned process, the task can be crowd sourced. For crowd sourcing the task, any known crowdsourcing platform can be used. The task will be published on the crowd sourcing platform where crowd workers can register for the task, perform the task, and accordingly get paid for their services. Finally, the results received from the crowd workers can be put in to an executable file. The executable file can be in an embodiment, a business process modeling notation (BPMN) file. However, for doing the above, the responses generated from the crowd workers should be high on the level of accuracy.

Figure 2:
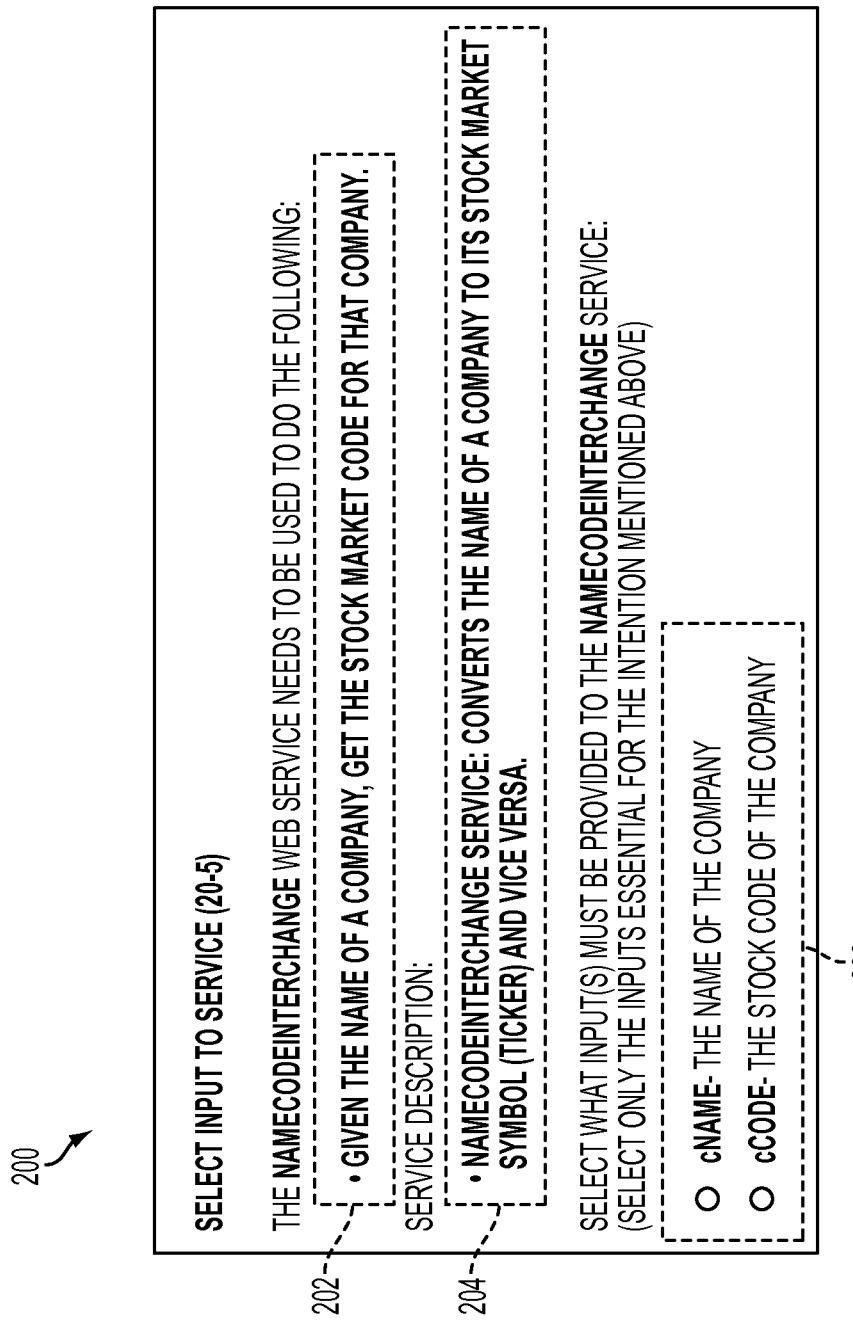
FIG. 2 illustrates a simplified crowd task in accordance with an embodiment.

FIG. 2 illustrates a simplified crowd task in accordance with an embodiment. The task can be published on any known work distribution platform wherein a plurality of crowd workers can view the task, register for completing the task, perform the required services, and get paid accordingly. In an embodiment the work distribution platform is any known crowdsourcing platform such as Amazon's Mechanical Turk, CrowdFlower etc. In the simplified version of the task, a clear instruction is provided to the crowd worker as to what the expected response is. Further, the creation of the augmented definition of the plurality of web services enables the extraction of the intent of the composition, the input required for the web services, the output expected from the web services, and the required mapping of the output of one service to the input of another service. These requirements are presented to the crowd worker in a simplified and direct manner.

FIG. 2 shows the first step of the creation of a web service composition, wherein the crowd worker is asked to decide the correct input required for the first web service 104. The user is presented with defined answer choices as can be seen from 202. The defined answer choices reduce the work required to be done by the crowd worker and also help in improving the overall accuracy of the responses received. As can be seen and appreciated from this exemplary task, the disclosed embodiments have done away with any verbose instructions for task completion. The verbose instructions had typically required the crowd worker to be aware of the concept of a web service composition, redirected them to the APIs of the web services and provided a response box where the crowd worker could input their response. The crowd workers are typically in a hurry to complete these tasks since the money involved is minimal. Hence, they do not want to spend time in reading in detail the instructions and usually end up typing the wrong answers in the text/response boxes. By providing defined options 202, the crowd worker is relieved of typing his response or understanding the intent of the creator. This automatically leads to higher level of accuracy in the response obtained from the crowd worker.

Figure 3:
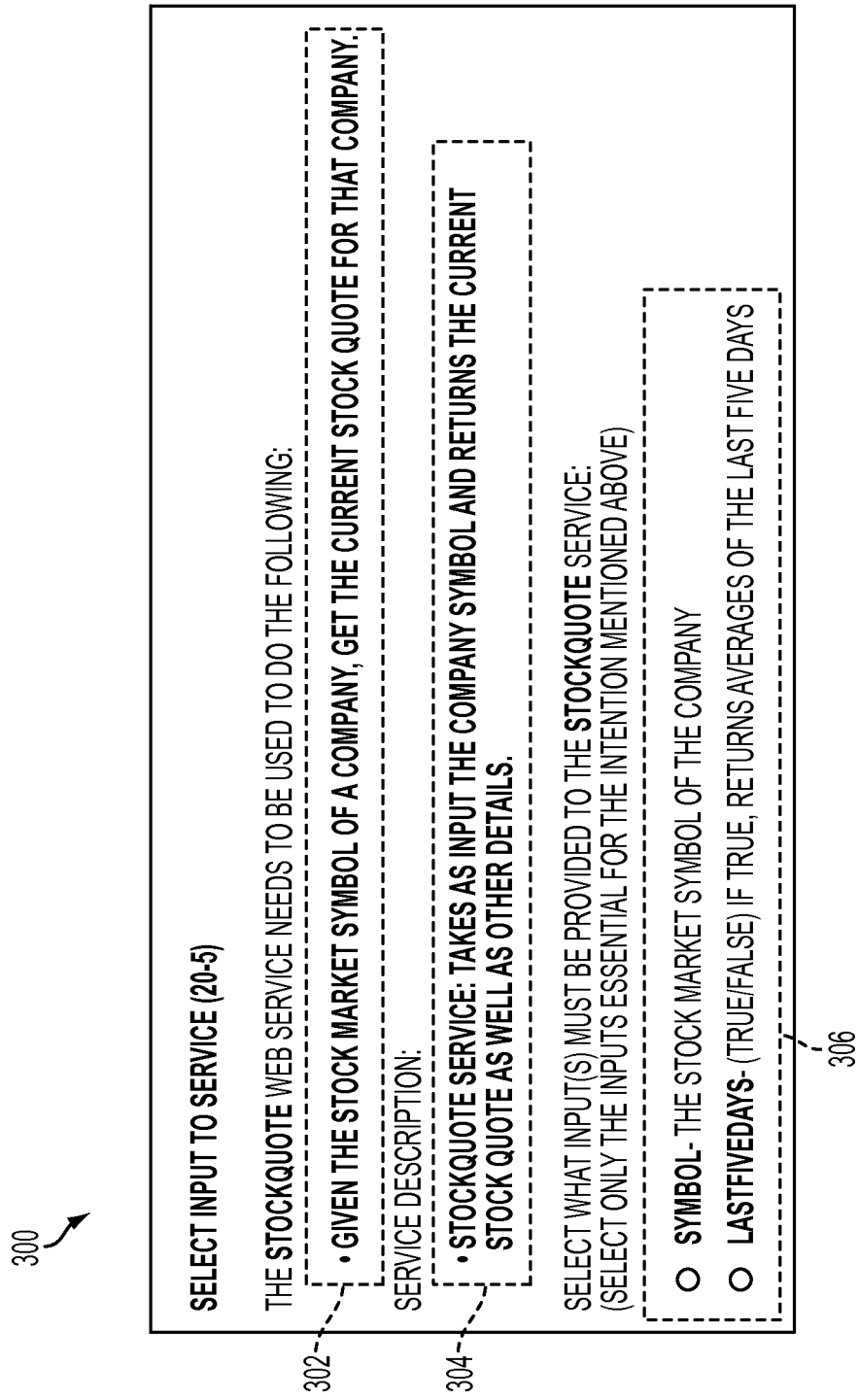
FIG. 3 illustrates the second simplified task presented to the crowd workers in order to generate the desired web service composition in accordance with an embodiment.

FIG. 3 illustrates the second simplified task presented to the crowd workers in order to generate the desired web service composition in accordance with an embodiment. In this step, the crowd worker is presented with a simplified instruction to use the stock market symbol of a company to obtain its stock quote. 302 is the simplified objective of the problem that is presented to the crowd worker and 306 are the defined response options. 304 illustrates the one-line instruction which the crowd worker must read in order to complete the task. Based on the reading of 304, the crowd worker can easily understand that he/she needs to use the company symbol to get the desired output. The crowd worker can then select the response in 306 and submit his work.

Figure 4:
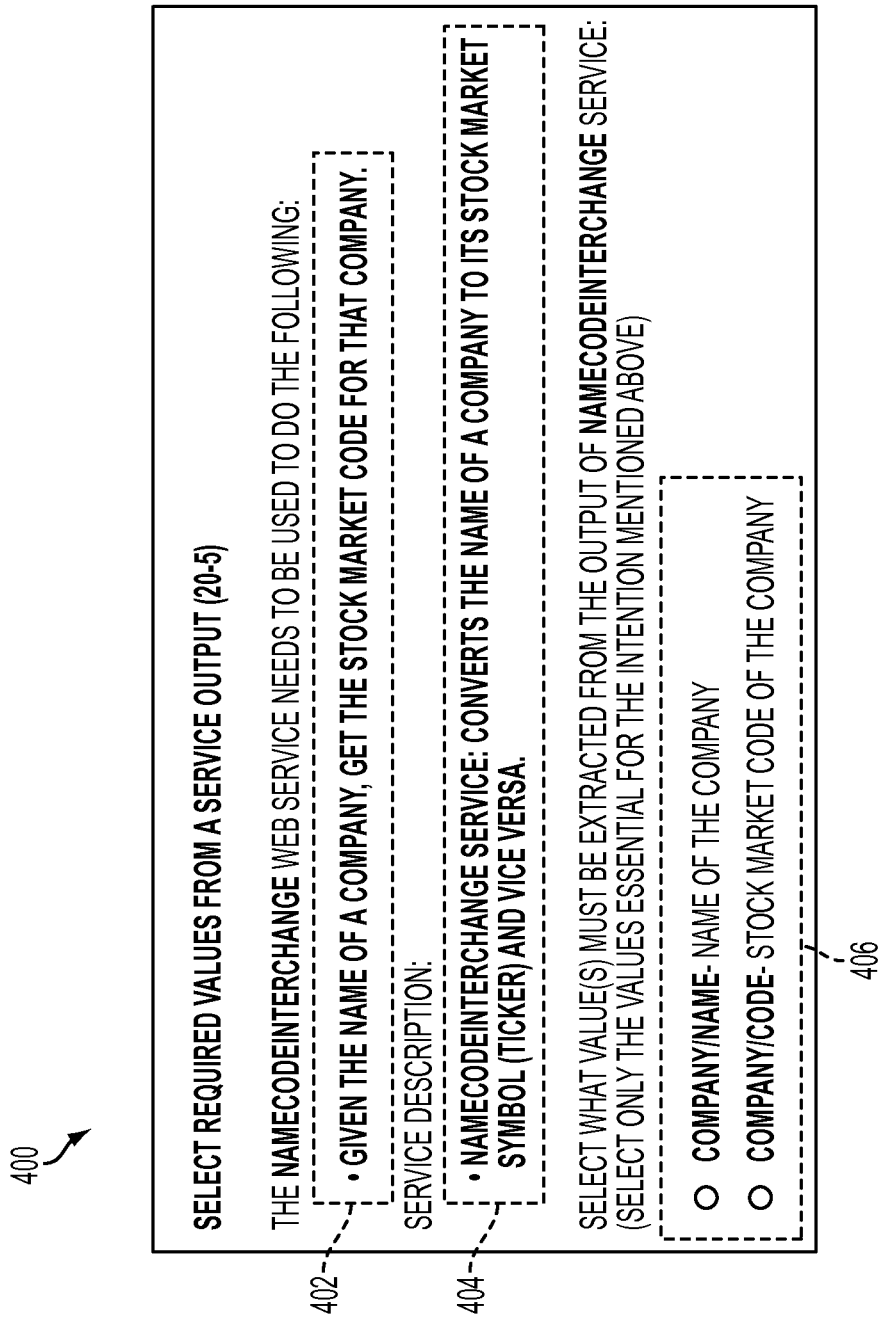
FIG. 4 illustrates the third simplified task presented to the crowd workers in order to generate the desired web service composition in accordance with an embodiment.

FIG. 4 illustrates the third simplified task presented to the crowd workers in order to generate the desired web service composition in accordance with an embodiment. In this illustrative figure, the crowd worker is asked to indicate the output to be captured from the first web service 104. The user is instructed to select which output he/she must consider in order to obtain the stock market symbol of a company given the company name. 402 represents the objective of the request. The crowd worker is presented with the instruction to complete the request in 404 and the defined answer choices are presented to the crowd worker in 406.

Figure 5:
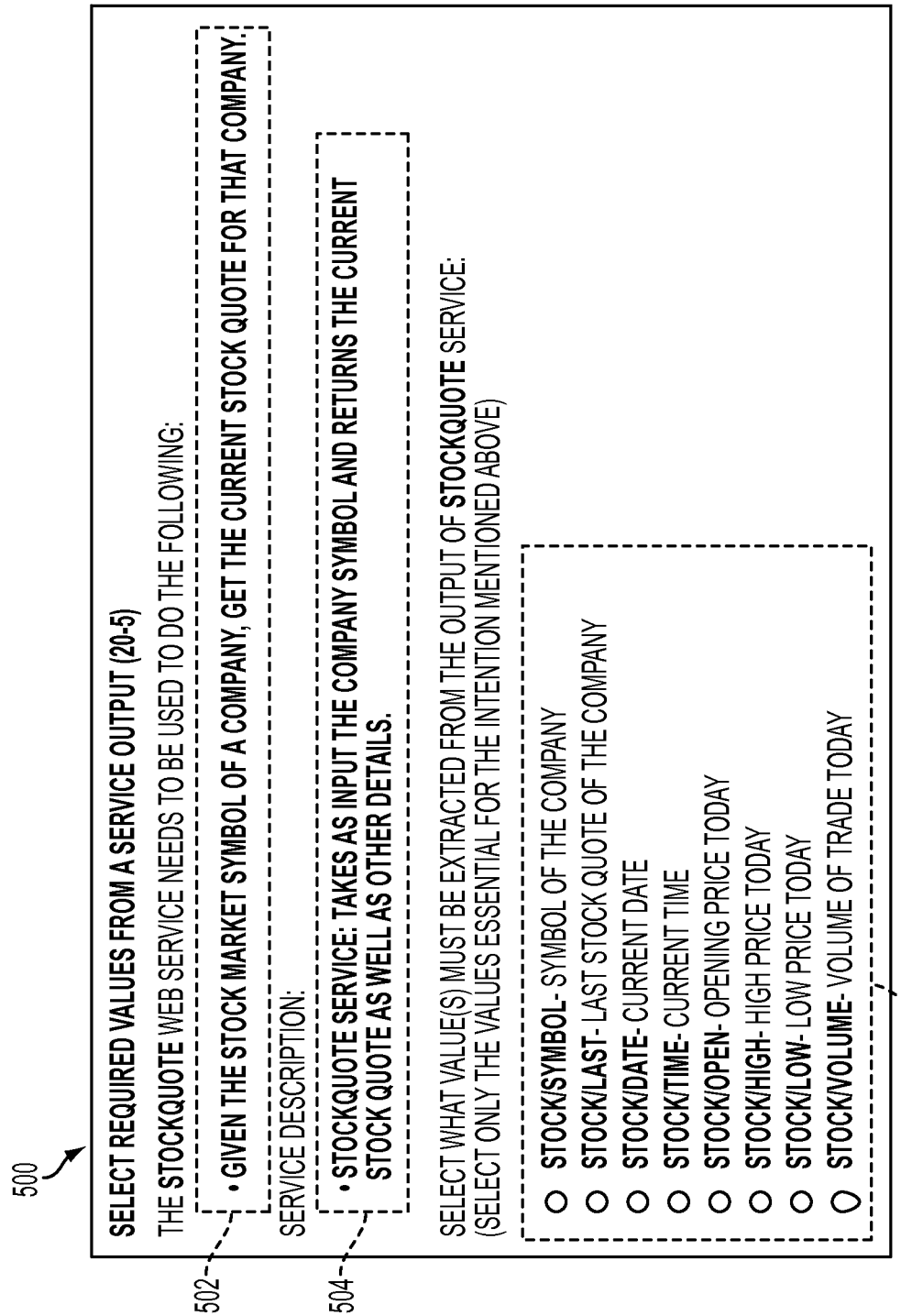
FIG. 5 represents the fourth simplified task presented to the crowd workers in order to generate the desired web service composition.

FIG. 5 represents the fourth simplified task presented to the crowd workers in order to generate the desired web service composition. In this illustrative figure, the crowd worker is asked to select the correct output representing the stock quote of a company when the stock symbol of the company is entered as an input. The user intent is depicted in 502 and 504 illustrates the instruction that is provided for the crowd worker to complete the task. The defined response options are illustrated in 506.

Figure 6:
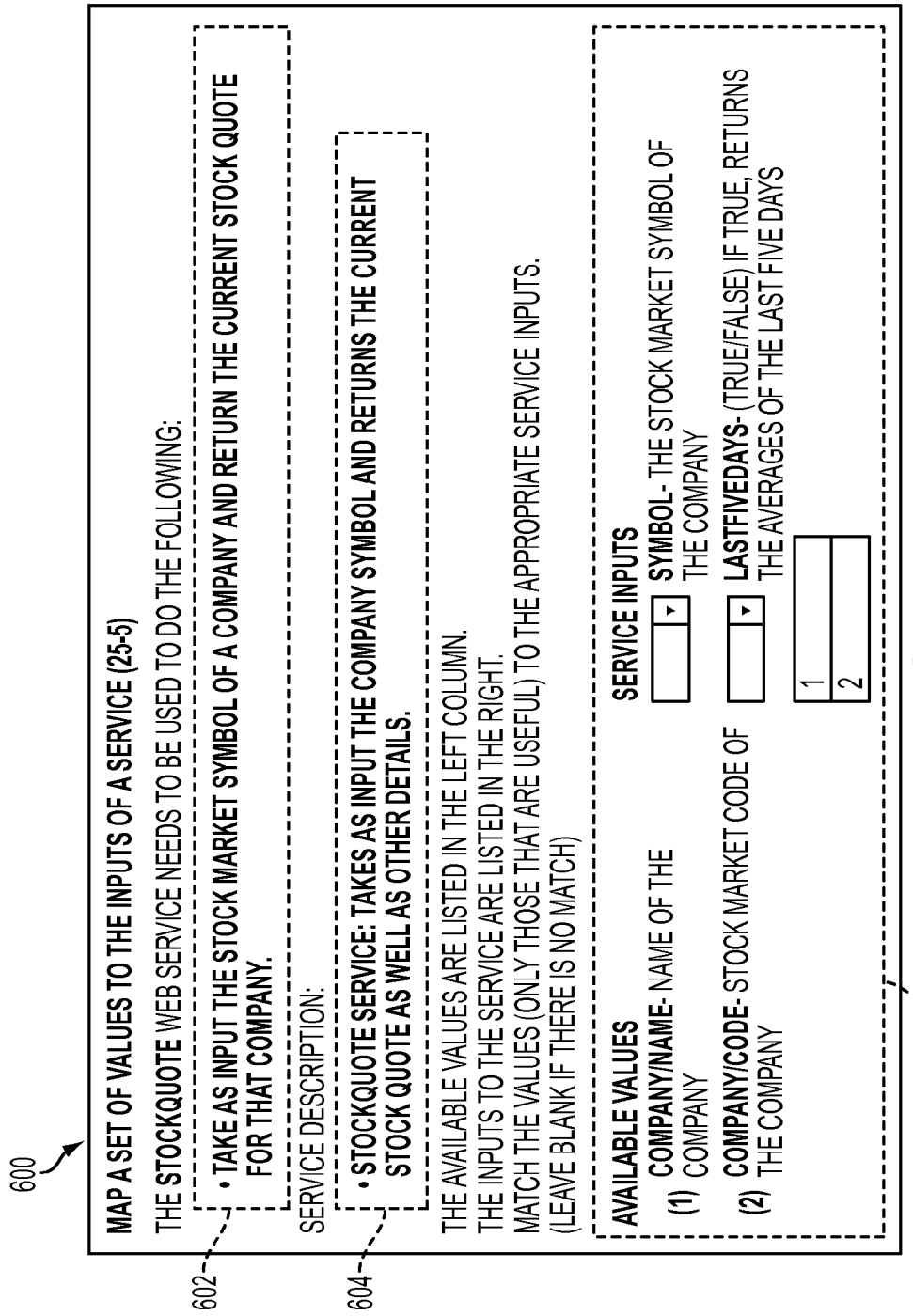
FIG. 6 represents the fifth simplified task presented to the crowd workers in order to generate the desired web service composition in accordance with an embodiment.

FIG. 6 represents the fifth simplified task presented to the crowd workers in order to generate the desired web service composition in accordance with an embodiment. In this illustrative figure, the crowd worker is asked to indicate the mapping between the two web services which would be required for generating the desired web service composition. For example, the stock market symbol of a company obtained as the output from the first web service 104 acts as the input to the second web service 110 in order to get the stock quote for the company. Hence, the output of the first web service 104 has to be mapped to the input of the second web service 110 in order to generate the desired web service composition. The crowd worker is not presented with the overall objective in order to simplify the task; and the intent and instruction that are provided to the crowd worker are represented by 602 and 604. Based on 602 and 604, the crowd worker is presented with the defined responses in 606 where he can select the required response for this crowd task.

As can be observed and appreciated from FIGS. 2-6, the simplicity of these crowd tasks in terms of providing simple, easy-to-understand instructions and the defined answer choices are a direct result of the augmented definition which was created for the plurality of web services. The augmented definitions are used to extract the inputs and outputs of the plurality of web services, which can then be directly used to create the crowd tasks.

Once the crowd workers have submitted responses to all the tasks, the correct responses can be made in to an executable file which can directly be used to create the web service composition.

Figure 7:
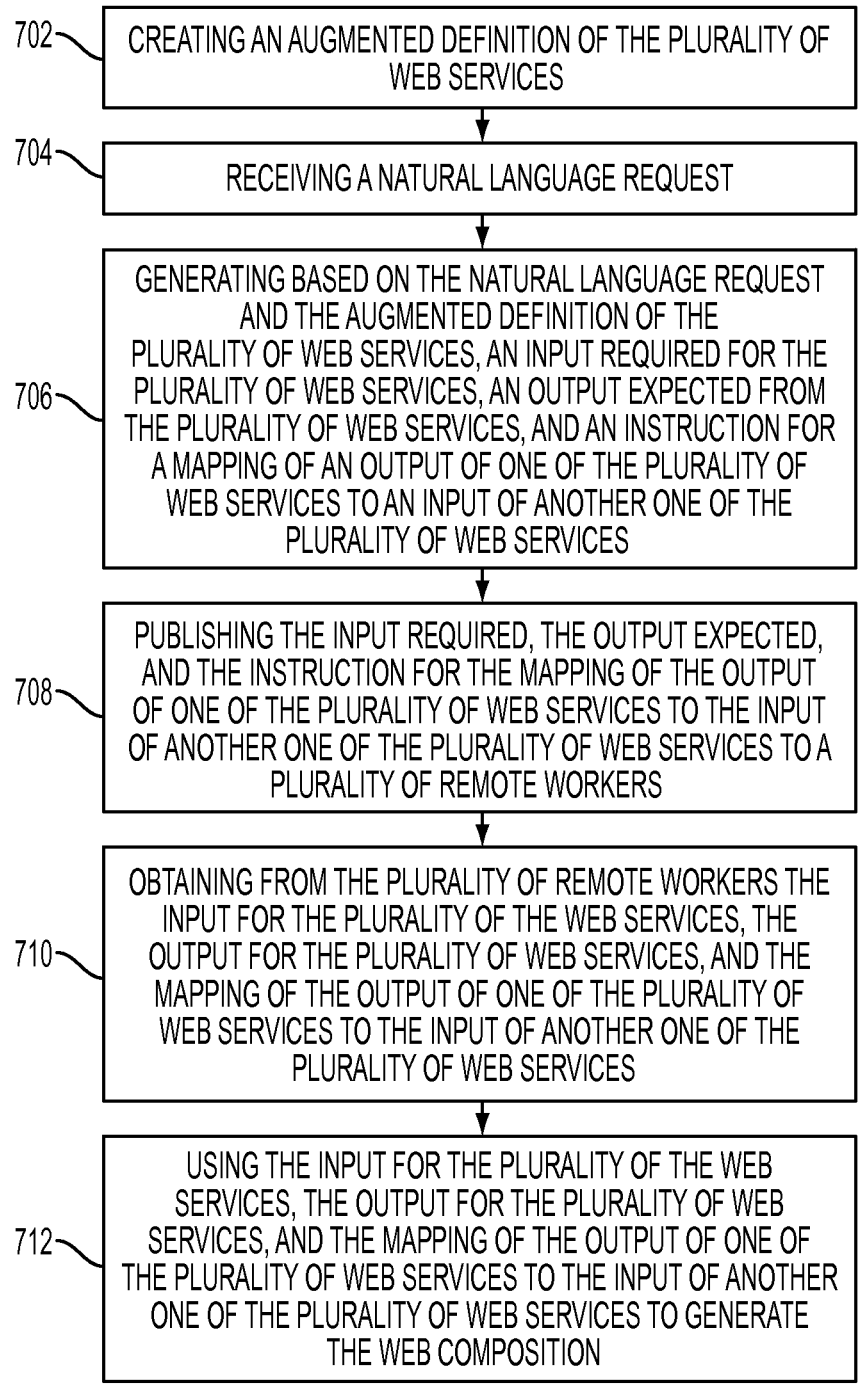
FIG. 7 is a flowchart detailing the steps involved in the creation of a web service composition from a plurality of web services in accordance with an embodiment.

FIG. 7 is a flowchart detailing the steps involved in the creation of a web service composition from a plurality of web services in accordance with an embodiment. At step 702, augmented definitions of the plurality of web services are created. As has been described in the detailed description of the embodiments preceding this paragraph, the augmented definition helps in clearly identifying the necessary inputs to and the outputs from a plurality of web services required for creating the desired web service composition. Creating the augmented definition is a one-time activity and it can later be re-used for serving any new user requests. At step 704, a request in natural language is received from the user. The natural language request comprises the intent of the composition and is later used to provide instructions to the crowd workers. At step 706, the augmented definition of the plurality of the web services and the natural language request are used to create the simplified crowd tasks to be completed by the crowd workers. In an embodiment, the simplified crowd tasks are published on a crowdsourcing platform. The simplified tasks clearly list the inputs needed for the services, the outputs expected and the desired mapping of the output of the first web service to the input of the second web service. The simplified task, as has been described in the detailed description preceding this discussion, does away with the verbosity of commonly seen crowd tasks which tend to confuse the crowd workers leading to reduced accuracy. The simplified task also does away with providing links to APIs of the various web services involved in creating the web service composition. At step 708, the simplified crowd task is published on an online crowd sourcing platform. Various crowd sourcing platforms are commonly known in the art. These can be one of, but not limited to, Amazon's MTurk, Crowd Flower, or any other known cloud-based crowd sourcing platform. A plurality of crowd workers are registered on the crowd sourcing platform and they can access the task and choose to undertake it in return for remuneration.

At step 710, the responses provided by the crowd workers are collected. At step 712, the correct responses are selected and the required inputs of the plurality of web services, the output of the web services, and the mapping of the output of one of the web services to the input of another one of the web services is compiled in to an executable file which can be directly used to generate the desired web service composition.

The method and computer code described above have numerous advantages. The disclosed embodiments propose a process for simplifying web service composition. Existing processes require a detailed understanding of the individual services and the process of service composition. By first creating augmented service definitions, the process of identifying appropriate inputs and outputs of services along with generating the composition script can be reduced to simple tasks that can be crowdsourced to a wider work force for less amount of money.

It will be appreciated that the description provided above in conjunction with the drawings is in no way meant to limit the scope of the disclosed embodiments. The description provided is in accordance with an embodiment. It will be understood by a person ordinarily skilled in the art that many more embodiments are possible and that the scope of the various possible embodiments is covered by the claims set forth.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

What is claimed is:

1. A computer implemented method for creating a web service composition from a plurality of web services, the method comprising:
   in a computer:
   creating an augmented definition of the plurality of web services;
   receiving a request to create the web service composition;
   generating a task based on the request and the augmented definition of the plurality of web services, wherein the task is utilizable to determine at least one of an input required for the plurality of web services, an output expected from the plurality of web services, or an instruction for mapping of an output of one of the plurality of web services to an input of another one of the plurality of web services;
   publishing the task to a plurality of crowd workers through a crowdsourcing platform, wherein the crowdsourcing platform corresponds to a platform that enables distribution of the task to the plurality of crowd workers located at different locations, and wherein the crowd workers receive a pre-decided remuneration for attempting the task;
   obtaining responses from the plurality of crowd workers for the task, wherein the responses from the plurality of crowd workers comprise at least one of the input for the plurality of the web services, the output for the plurality of web services, or mapping of the output of one of the plurality of web services to the input of another one of the plurality of web services; and
   using the input for the plurality of the web services, the output for the plurality of web services, and mapping of the output of one of the plurality of web services to the input of another one of the plurality of web services, to generate the web service composition.

2. The computer implemented method of claim 1, wherein the request is in natural language.

3. The computer implemented method of claim 1, wherein the request is utilizable to provide instructions to the plurality of crowd workers.

4. The computer implemented method of claim 1 further comprising providing defined response options to the plurality of crowd workers.

5. The computer implemented method of claim 4, wherein the plurality of crowd workers is presented with a list of possible responses.

6. The computer implemented method of claim 1, wherein a web service corresponds to a website accessible through the internet.

7. The computer implemented method of claim 1, wherein the augmented definition corresponds to a modification made to a script of a web service.

8. A computer program product for use with a computer, the computer program product comprising a non-transitory computer usable medium having a computer readable program code embodied therein for creating a web service composition from a plurality of web services, the computer readable program code is used by the computer to:

create an augmented definition of the plurality of web services;

receive a request to create the web service composition;

generate a task based on the request and the augmented definition of the plurality of web services, wherein the task is utilizable to determine at least one of an input required for the plurality of web services, an output expected from the plurality of web services, or an instruction for mapping of an output of one of the plurality of web services to an input of another one of the plurality of web services;

publish the task to a plurality of crowd workers through a crowdsourcing platform, wherein the crowdsourcing platform corresponds to a platform that enables distribution of the task to the plurality of crowd workers located at different locations, and wherein the crowd workers receive a pre-decided remuneration for attempting the task;

obtain responses from the plurality of crowd workers for the task, wherein the responses from the plurality of crowd workers comprise at least one of the input for the plurality of the web services, the output for the plurality of web services, or mapping of the output of one of the plurality of web services to the input of another one of the plurality of web services; and use the input for the plurality of the web services, the output for the plurality of web services, and mapping of the output of one of the plurality of web services to the input of another one of the plurality of web services, to generate the web service composition.

9. The computer program product of claim 8, wherein the computer readable program code is further used by the computer to provide defined response options to the plurality of crowd workers.

10. A computer implemented method for creating a web service composition from a plurality of web services, the method comprising:

in a computer:

creating an augmented definition of the plurality of web services;

receiving a natural language request to create the web service composition;

generating a task based on the natural language request and the augmented definition of the plurality of web services, wherein the task is utilizable to determine at least one of an input required for the plurality of web services, an output expected from the plurality of web services, or an instruction for mapping of an output of one of the plurality of web services to an input of another one of the plurality of web services;

publishing the task to a plurality of crowd workers through a crowdsourcing platform, wherein the publishing further comprises presenting response choices to the plurality of crowd workers, wherein the crowdsourcing platform corresponds to a platform that enables distribution of the task to the plurality of crowd workers located at different locations, and wherein the crowd workers receive a pre-decided remuneration for attempting the task;

obtaining responses from the plurality of crowd workers for the task, wherein the responses from the plurality of crowd workers comprise at least one of the input for the plurality of the web services, the output for the plurality of web services, or mapping of the output of one of the plurality of web services to the input of another one of the plurality of web services; and using the input for the plurality of the web services, the output for the plurality of web services, and mapping of the output of one of the plurality of web services to the input of another one of the plurality of web services, to create an executable file; and using the executable file to generate the web service composition.

11. The method of claim 10, wherein the input required, the output expected, and the instruction for mapping of the output of one of the plurality of web services to the input of another one of the plurality of web services is published on a crowdsourcing platform.

* * * * *